United States Patent
Hwang et al.

(10) Patent No.: US 10,630,803 B2
(45) Date of Patent: Apr. 21, 2020

(54) PREDICTIVE DATA PREFETCHING FOR CONNECTED VEHICLES

(71) Applicant: International Business Machines Corporation, Armonk, NY (US)

(72) Inventors: Jinho Hwang, Ossining, NY (US); Shriram Rajagopalan, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 767 days.

(21) Appl. No.: 15/198,741

(22) Filed: Jun. 30, 2016

(65) Prior Publication Data
US 2018/0007161 A1  Jan. 4, 2018

(51) Int. Cl.
| G06F 15/167 | (2006.01) |
| H04L 29/08 | (2006.01) |
| G01C 21/34 | (2006.01) |
| H04W 4/44 | (2018.01) |

(52) U.S. Cl.
CPC ...... *H04L 67/2847* (2013.01); *G01C 21/3461* (2013.01); *H04L 67/12* (2013.01); *H04W 4/44* (2018.02)

(58) Field of Classification Search
CPC ...... H04L 67/2847; H04L 67/12; H04W 4/44; G01C 21/3461
See application file for complete search history.

(56) References Cited

U.S. PATENT DOCUMENTS

| 5,737,747 A | 4/1998 | Vishlitzky et al. |
| 9,020,536 B1* | 4/2015 | Crossno ............. G06Q 10/0833 455/456.1 |
| 9,222,787 B2* | 12/2015 | Blumenberg .......... G01C 21/32 |
| 9,247,523 B1* | 1/2016 | Bhatia ..................... H04W 4/02 |
| 9,716,787 B1* | 7/2017 | Prakah-Asante .......................... G01C 21/3415 |

(Continued)

FOREIGN PATENT DOCUMENTS

WO  2013059864 A1  5/2013

OTHER PUBLICATIONS

Sensorly LLC, "About Us | Sensorly", http://www.sensorly.com/about-us, Accessed Online: Jun. 30, 2016, 2 pages.

(Continued)

Primary Examiner — Krisna Lim
(74) Attorney, Agent, or Firm — Cantor Colburn LLP; Anthony Curro

(57) ABSTRACT

Embodiments of the present disclosure are directed to a computer implemented method of receiving data at a vehicle having control circuitry configured to wirelessly couple a processor system of the vehicle to a network. The method includes determining, using the processor system, a route that is expected to be traveled by the vehicle. The method further includes determining, using the processor system, a portion of the route that includes a buffering zone, wherein the buffering zone comprises an area in which the strength of signals transmitted over the network meets a predetermined criterion. The method further includes, based at least in part on a determination that the vehicle is within the buffering zone, pre-fetching data from a source over the network.

19 Claims, 10 Drawing Sheets

(56) References Cited

U.S. PATENT DOCUMENTS

| | | |
|---|---|---|
| 2011/0167128 A1 | 7/2011 | Raghunathan et al. |
| 2013/0035110 A1* | 2/2013 | Sridhara ............... H04W 4/029 455/456.1 |
| 2014/0067257 A1* | 3/2014 | Dave .................. G01C 21/3461 701/423 |
| 2015/0145995 A1 | 5/2015 | Shahraray et al. |
| 2016/0080456 A1 | 3/2016 | Ma et al. |

OTHER PUBLICATIONS

OpenSignal, "3G and 4G LTE Cell Coverage Map—OpenSignal", http://opensignal.com/, Accessed Online: Jun. 30, 2016, 3 pages.

* cited by examiner

PREDICTIVE DATA PREFETCHING FOR CONNECTED VEHICLES

BACKGROUND

The present disclosure relates in general to connected vehicles. More specifically, the present disclosure relates to methods, systems and computer program products for prefetching data in order to allow an in-vehicle infotainment (IVI) system of a connected vehicle to provide uninterrupted data streams when the vehicle travels through a dead zone of a route.

Connected vehicles typically included IVI systems having the capability deliver internet-based entertainment and information content inside the vehicle. IVI systems frequently utilize Bluetooth technology, Wi-Fi technology, cellular connectivity, and/or smartphones to help drivers/users control the system with voice commands, touch-screen inputs or physical controls. Typical tasks performed by IVI systems include managing and playing audio content, utilizing navigation systems for driving, delivering rear-seat entertainment such as movies, games, social networking, etc., delivering incoming and sending outgoing SMS text messages, making phone calls, and accessing internet-enabled or smartphone-enabled content such as traffic conditions, sports scores and weather forecasts.

Poor quality network connectivity negatively impacts a user's online experience, particularly for streaming content. A connected vehicle traveling on a given route will pass through areas having varying connectivity. For example, when a connected vehicle moves through edges of cell towers, tunnels, mountain areas, and the like, the internet carrier signal strength received at the vehicle degrades significantly.

SUMMARY

Embodiments of the present disclosure are directed to a computer implemented method of receiving data at a vehicle having control circuitry configured to wirelessly couple a processor system of the vehicle to a network. The method includes determining, using the processor system, a route that is expected to be traveled by the vehicle. The method further includes determining, using the processor system, a portion of the route that includes a buffering zone, wherein the buffering zone comprises an area in which the strength of signals transmitted over the network meets a predetermined criterion. The method further includes, based at least in part on a determination that the vehicle is within the buffering zone, pre-fetching data from a source over the network.

Embodiments of the present disclosure are further directed to a computer implemented method of evaluating potential routes of a vehicle having control electronics configured to wirelessly couple a processor system of the vehicle to a network. The method includes for each one of multiple possible routes, determining, using the processor system, portions of the possible routes that include a dead zone, wherein the dead zone comprises an area in which the strength of signals transmitted over the network meets a predetermined criterion. The method further includes selecting one of the multiple possible routes based at least in part on the portions of the possible routes that include a dead zone.

Embodiments of the present disclosure are further directed to a computer program product for receiving data at a vehicle having control circuitry configured to wirelessly couple a processor system of the vehicle to a network. The computer program product includes a computer readable storage medium having program instructions embodied therewith, wherein the computer readable storage medium is not a transitory signal per se. The program instructions are readable by the processor system to cause the processor system to perform a method including determining a route that is expected to be traveled by the vehicle. The method further includes determining a portion of the route that includes a buffering zone, wherein the buffering zone comprises an area in which the strength of signals transmitted over the network meets a predetermined criterion. The method further includes based at least in part on a determination that the vehicle is within the buffering zone, pre-fetching data from a source over the network.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

Figure 1:
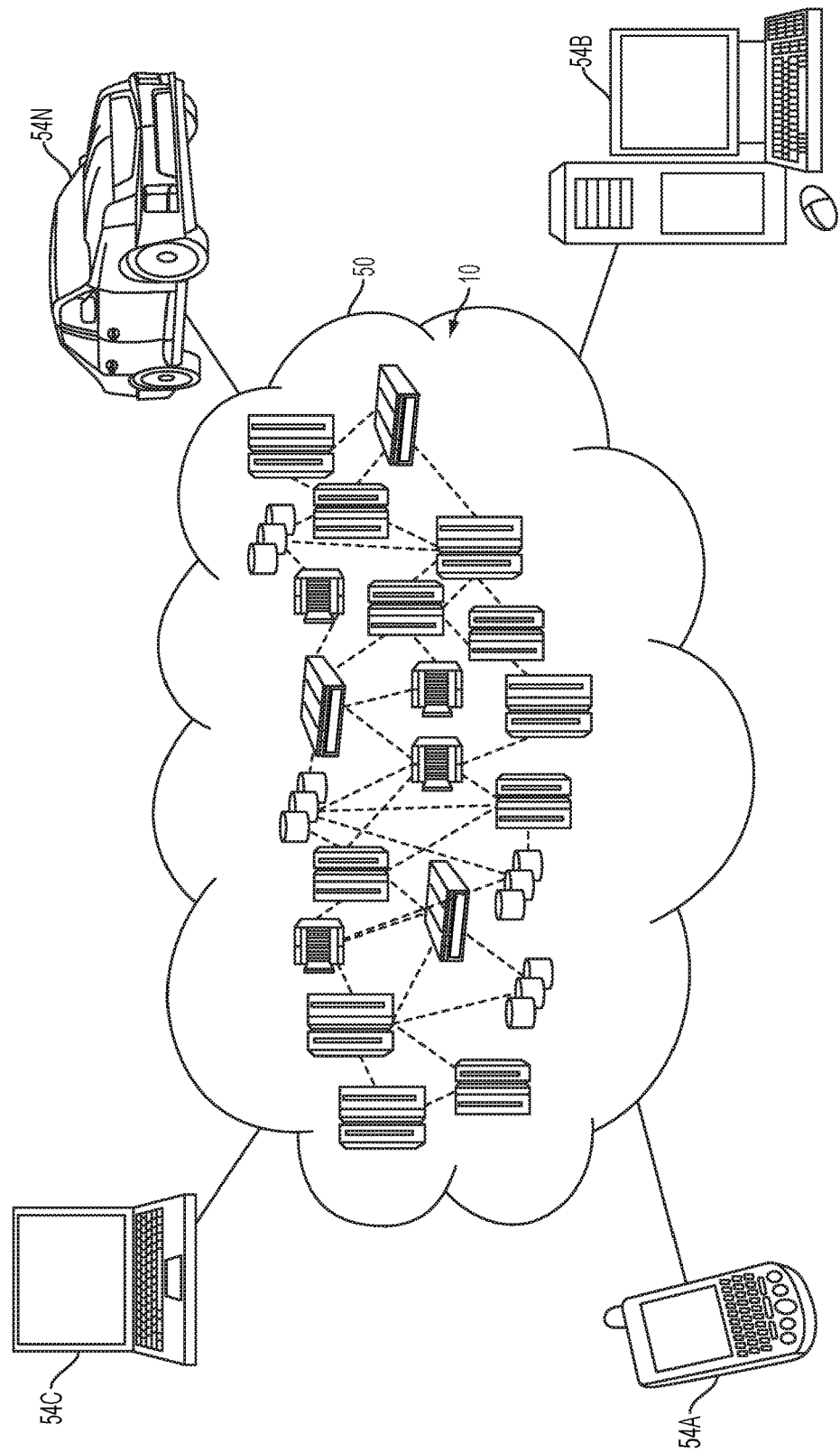
FIG. 1 depicts a cloud computing environment according to one or more embodiments of the present disclosure.

In the accompanying figures and following detailed description of the disclosed embodiments, the various elements illustrated in the figures are provided with two, three or four digit reference numbers. In most instances, the leftmost digit(s) of each reference number corresponds to the figure in which its element is first illustrated.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
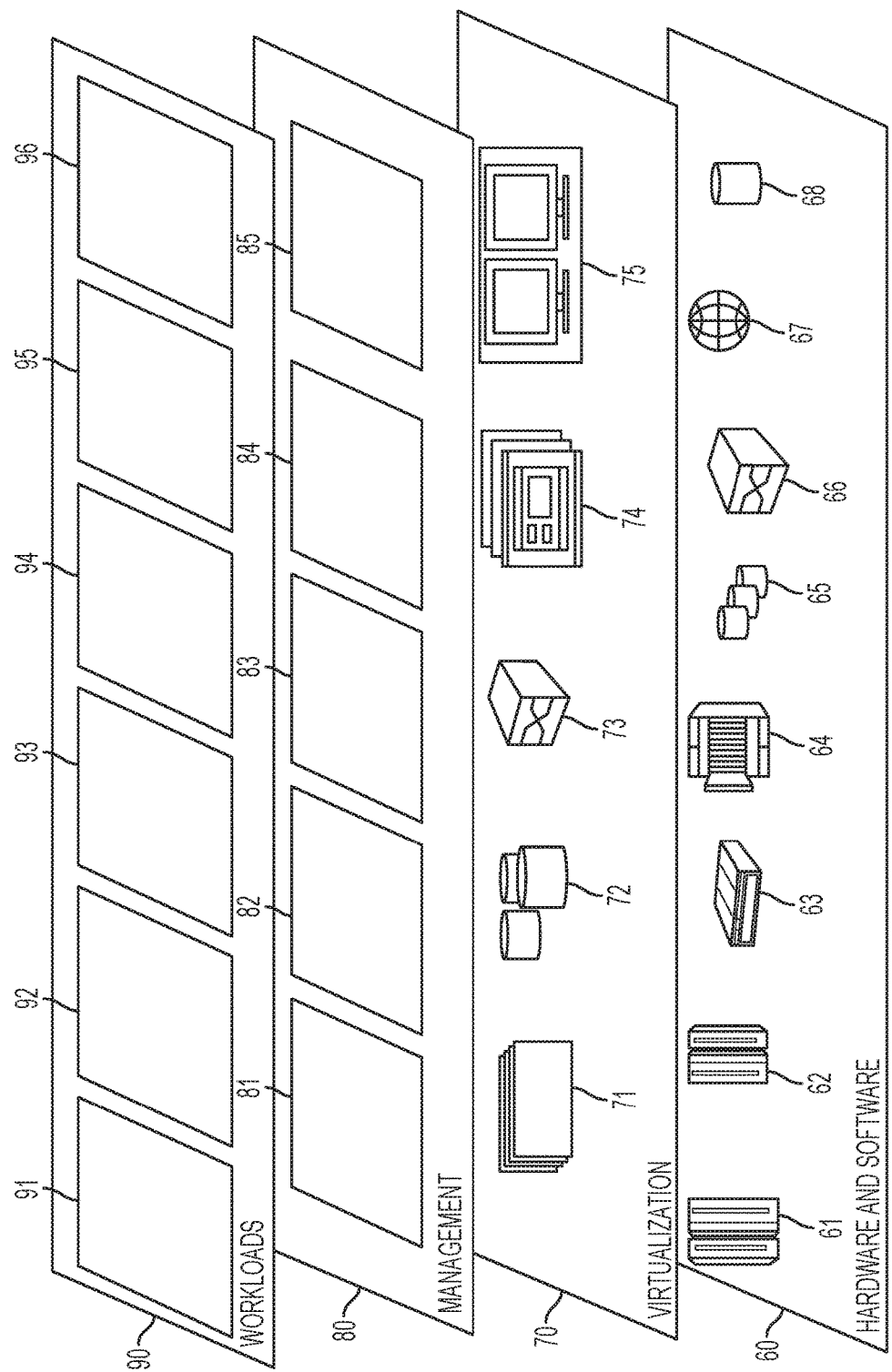
FIG. 2 depicts abstraction model layers according to one or more embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data pre-fetching 96.

Figure 3:
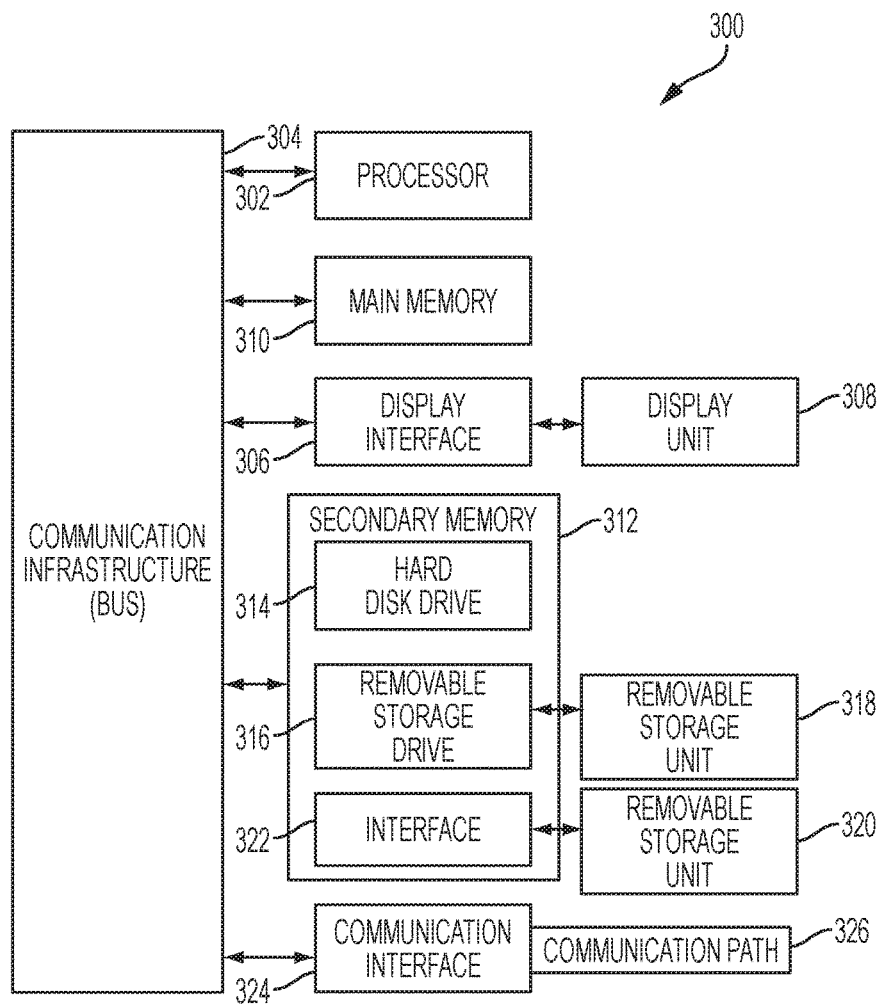
FIG. 3 depicts details of an exemplary computing system capable of implementing one or more aspects of the presents disclosure.

FIG. 3 depicts a high level block diagram computer system 300, which may be used to implement one or more aspects of the present disclosure. More specifically, computer system 300 may be used to implement hardware components of cloud computing system 50 (shown in FIG. 2) and/or vehicle electronics system 430 (shown in FIGS. 4 and 5). Although one exemplary computer system 300 is shown, computer system 300 includes a communication path 326, which connects computer system 300 to additional systems (not depicted) and may include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In alternative embodiments, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310 and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

The terms "vehicle," "car," "automobile," and variations thereof may be used interchangeably herein and can refer to a device or structure for transporting animate and/or inanimate or tangible objects (e.g., persons and/or things), such as a self-propelled conveyance. A vehicle as used herein can include any conveyance or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The phrase "vehicle navigation system" and variations thereof, as used herein, can refer to a satellite navigation system designed for use in vehicles. A satellite navigation system typically uses a GPS navigation device to acquire position data to locate the user on a road in the unit's map database. Using the road database, the unit can give directions to other locations along roads also in its database. Dead reckoning using distance data from sensors attached to the drive train, a gyroscope and an accelerometer can be used for greater reliability, as GPS signal loss and/or multipath can occur due to urban canyons or tunnels.

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus may also refer to a part of a communication hardware that interfaces the communication hardware with interconnects that connect to other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

The phrases "communication device," "smartphone," and "mobile device," and variations thereof, as used herein, can be used interchangeably and may include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "communication modality," and variations thereof, as used herein, can refer to any communication protocol such as Voice-Over-Internet-Protocol ("VoIP"), cellular communications (e.g., IS-95, 1G, 2G, 3G, 3.5G, 4G, 4G/IMT-Advanced standards, 3GPP, WIMAX™, GSM, CDMA, CDMA2000, EDGE, 1 xEVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or MSN Messenger™, Wireclub, Xfire, and Yahoo! Messenger™), email, Twitter (e.g., tweeting), Digital Service Protocol (DSP), and the like.

The phrases "communication system" or "communication network," and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers to some type of wired or wireless communication link that connects various components, such as communication hardware, within a communication system.

Additionally, a communication network may refer to a specific setup of a communication system with the collection of individual communication hardware and interconnects having some definable network topography. A communication network may include wired and/or wireless network having a pre-set to an ad hoc network structure. Some of the basic hardware components that can be used in networks include interface cards, repeaters, hubs, bridges, switches, routers, proxies, and firewalls. Interface cards allow computers to communicate over the network with a low-level addressing system using media access control (MAC) addresses to distinguish one computer from another. Repeaters are electronic devices that amplify communication signals and also filter noise from interfering with the signals. Hubs contain multiple ports, thus allowing a packet of information/data to be copied unmodified and sent to all computers on the network. Bridges connect network segments, which allow information to flow only to specific destinations. Switches are devices that forward, make forwarding decisions and otherwise filter chunks of data communications between ports according to the MAC addresses in the packets of information. Routers are devices that forward packets between networks by processing the information in the packet. Firewalls reject network access requests from unsafe sources, but allow requests for safe ones.

The phases "infotainment," "infotainment system," "in-vehicle infotainment system," and variations thereof, as used herein, are used interchangeably and can refer to the hardware/software products, data, content, information, and/or systems, which can be built into or added to vehicles to enhance driver and/or passenger experience. The phrase "infotainment systems" includes systems having the capability to access the internet to deliver entertainment and information content inside the vehicle. Infotainment systems can utilize Bluetooth technology, Wi-Fi technologies, cellular data technologies such as 4G LTE, and/or smartphones to help drivers/users control the system with voice commands, touch-screen input, or physical controls. Typical tasks performed by infotainment system include managing and playing audio content, utilizing navigation for driving, delivering rear-seat entertainment such as movies, games, social networking, etc., listening to incoming and sending outgoing SMS text messages, making phone calls, and accessing internet-enabled or smartphone-enabled content such as traffic conditions, sports scores and weather forecasts.

The phrases "vehicle navigation system," "satellite positioning system receiver," and variations thereof, as used herein, can refer to a wireless receiver or transceiver to receive and/or send location signals from and/or to a satellite positioning system (SPS), such as the Global Positioning System ("GPS") (US), GLONASS (Russia), Galileo positioning system (EU), Compass navigation system (China), and Regional Navigational Satellite System (India).

The terms "determine," "calculate," and "compute," and variations thereof, as used herein, are used interchangeably and include any type of methodology, process, mathematical operation, or technique.

The phrases "in communication with" or "communicatively coupled to" and variations thereof may be used interchangeably herein and can refer to any coupling, connection, or interaction using electrical signals to exchange information or data, using any system, hardware, software, protocol, or format, regardless of whether the exchange occurs wirelessly or over a wired connection.

The phrase "data stream," and variations thereof, as used herein, can refer to a set of digital signals used for different kinds of content transmission. Data streams work in many different ways across many modern technologies, with industry standards to support broad global networks and individual access. Many data streams are controlled using a packet-based system. The common 3G and 4G wireless platforms, as well as Internet transmissions, are composed of these sets of data packets that are handled in specific ways. For example, packets typically include headers that identify the origin or intended recipient, along with other information that can make data stream handling more effective.

The phrase "data streaming," and variations thereof, as used herein, can refer to the transfer of data at a steady high-speed rate sufficient to support such applications as high-definition television (HDTV) or the continuous backup copying to a storage medium of the data flow within a computer. Data streaming requires some combination of bandwidth sufficiency and, for real-time human perception of the data, the ability to make sure that enough data is being continuously received without any noticeable time lag.

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

As previously noted herein, connected cars typically included IVI systems having the capability to deliver internet-based entertainment and information content inside the vehicle. IVI systems frequently utilize Bluetooth technology, Wi-Fi technology, cellular data technologies such as 4G LTE, and/or smartphones to help drivers/users control the system with voice commands, touch-screen inputs, or physical controls. Typical tasks performed by IVI systems include managing and playing audio content, utilizing navigation systems of the IVI for driving, delivering rear-seat entertainment such as movies, games, social networking, etc., delivering incoming and sending outgoing SMS text messages, making phone calls, and accessing internet-enabled or smartphone-enabled content such as traffic conditions, sports scores and weather forecasts.

Poor quality network connectivity negatively impacts a user's online experience, particularly for steaming video applications. A connected vehicle traveling on a given route will pass through areas having varying connectivity. For example, when a connected vehicle moves through edges of cell towers, tunnels, mountain areas, and the like, the internet carrier signal strength received at the vehicle degrades significantly.

Turning now to an overview of the present disclosure, one or more embodiments provide methods, systems and computer program products for incorporating in a vehicle's electronic circuitry a decision engine that, working in concert with the vehicle's IVI system, improves the quality of a passenger's in-vehicle online experience during a journey. The decision engine and IVI system are described separately herein as a matter of convenience. However, in practice, the decision engine and IVI system may be an integrated component. By analyzing in advance one or more selected factors, including but not limited to the travel route a vehicle is going to take (or is taking), the availability of network connectivity along a selected vehicle travel route, and the active or expected data streams coming into the IVI system, the decision engine in the vehicle can improve the user experience of certain applications such as video streaming, smartphone based GPS applications, etc., even if the vehicle is completely cut off from carrier networks (such as traveling through a tunnel) during the journey.

Based on the decision engine's analysis of the one or more selected factors, the decision engine identifies whether or not users consume the same contents and reuses any previously downloaded content. This buffering optimization eliminates the need to download redundant data.

Based on the decision engine's analysis of the one or more selected factors, the decision engine identifies zones along the selected route having high connectivity (e.g., high carrier signal strength). When the decision engine and IVS system determine that the vehicle is in a zone along the selected route having high connectivity, the decision engine controls the vehicle IVI system to increase the buffer size (i.e., increase the IVI system's download bandwidth), pre-fetch content of the data stream(s) coming into the vehicle, and storing the pre-fetched data in memory (e.g., cache memory). Hence, a zone along a selected route having high connectivity is referred to herein as a buffering zone.

Based on the decision engine's analysis of the one or more selected factors, the decision engine identifies zones along the selected route having low or no connectivity (e.g., low or no carrier signal strength). When the decision engine and IVS system determine that the vehicle is in a zone along the route having low or no connectivity, the decision engine controls the vehicle IVI system to switch from accessing the streaming content from the IVI system's wireless signal path (e.g., 4G LTE circuitry) to accessing the streaming content that was pre-fetched in the buffering zone and stored in memory. Hence, a zone along a route having low or no connectivity is referred to herein as a dead zone. When the vehicle traverses through the dead zone, content is served from the pre-fetched/stored content data without causing any disruption to the user experience.

Based on the decision engine's analysis of the one or more selected factors, the decision engine determines an estimate of the amount of data to pre-fetch in the buffering zone(s). The amount of pre-fetched data to buffer may be selected in order to ensure that enough (or more than enough) data is stored in memory to last for the duration of the vehicle's time within the upcoming dead zone(s).

In one or more embodiments, data about the above-described availability of network connectivity along a selected vehicle travel route is obtained by the decision engine controlling the IVI system to access so-called "signal maps," which provide signal strength data for a wide variety of areas. In one or more embodiments, the signal maps are accessed from a cloud-based network. Signal maps may be obtained from proprietary sources, such as the various wireless network carriers and/or internet service providers (ISPs). Signal maps may also be obtained from publicly available sources such as www.opensignal.com, www.sensorly.com, and the like.

In one or more embodiments, the decision engine works in concert with the vehicle navigation system to analyze in advance the one or more selected factors in order to influence the route planned by the vehicle navigation system. In one or more embodiments, the vehicle navigation system is included in the vehicle IVS system. In one or more embodiments, the decision engine influences the planned route by controlling the navigation system to determine the connectivity along the various route options for reaching the selected destination, determining the route option(s) that provide the most network connectivity (e.g., fewest dead zones, least estimated time in dead zones, etc.), and offering to the driver or a passenger the option of choosing a route option having the most network connectivity (i.e., the "most connected" route). In one or more embodiments, in the event that the most connected route contains dead zones having limited or insufficient wireless connectivity, the decision engine can adaptively utilize the disclosed pre-fetch/store techniques to identify buffering zones and pre-fetch/store streaming data (e.g., streaming movie, music, multiple episodes of a TV series, etc.) for later use when the vehicle is in the dead zone(s).

In one or more embodiments, in order to identify buffering zones, identify dead zones, determine the amount of data to pre-fetch, and identify the "most connected" route(s), the decision engine correlates information (i.e., the above-described one or more factors) from multiple sources, including but not limited to the route planned by the vehicle navigation system (e.g., GPS), signal coverage maps, an estimate of the time or distance duration of low/no network connectivity in a dead zone, environmental factors (e.g., tunnels, mountains, etc.) and the applications that the passengers are accessing or plan to access through the vehicle IVS system.

In one or more embodiments, one or more of the above-described selected factors may be accessed by the decision engine and/or IVI system through a cloud computing network. In one or more embodiments, the one or more selected factors used by the decision engine include but are not limited to an estimate of the duration of low/no network connectivity in a dead zone, vehicle driving speed, traffic along the selected route, etc. In one more embodiments, the decision engine makes the above-described determinations (e.g., a 2 mile stretch on Interstate Highway 45 of the planned route is in a buffering zone, the amount of data to pre-fetch in a buffering zone, etc.) based on identifying correlations between and among the above-described one or more factors. In one or more embodiments, the correlations are identified using a correlation coefficient. In one or more embodiments, the correlation coefficient is a Pearson product-moment correlation coefficient, which is also known as a Pearson r coefficient.

In one or more embodiments, the decision engine monitors the active data streams and automatically controls the IVI system to apply the disclosed pre-fetch/store techniques to the active streams. In one or more embodiments, the decision engine controls the IVI system to solicit the driver or passengers to provide the IVS system with an identification (or selection) of any other streaming data content to which the driver/passenger would like the decision engine and IVI system to apply the disclosed pre-fetch/store technique. The selection of the other streaming data content may be provided to the IVS system by a driver/passenger before or during the trip. In one or more embodiments, the decision engine monitors the active or planned video streams into the vehicle IVS system and proactively pre-fetches portions of the active or planned video streams while the vehicle is in a buffering zone and before the vehicle enters a dead zone. In one or more embodiments, if multiple display devices (e.g., mobile phone, PDA, display, etc.) in communication with the vehicle IVI system are using the same data source (e.g., watching the same drama), the decision engine can coordinate the data sharing among display devices to minimize the data reception. The decision engine can pre-fetch multiple episodes or an entire movie depending on the length of the travel or the user's patterns. The decision engine can also recommend a number of episodes in a TV series to pre-fetch based on a predicted period of travel through a dead zone.

Figure 4:
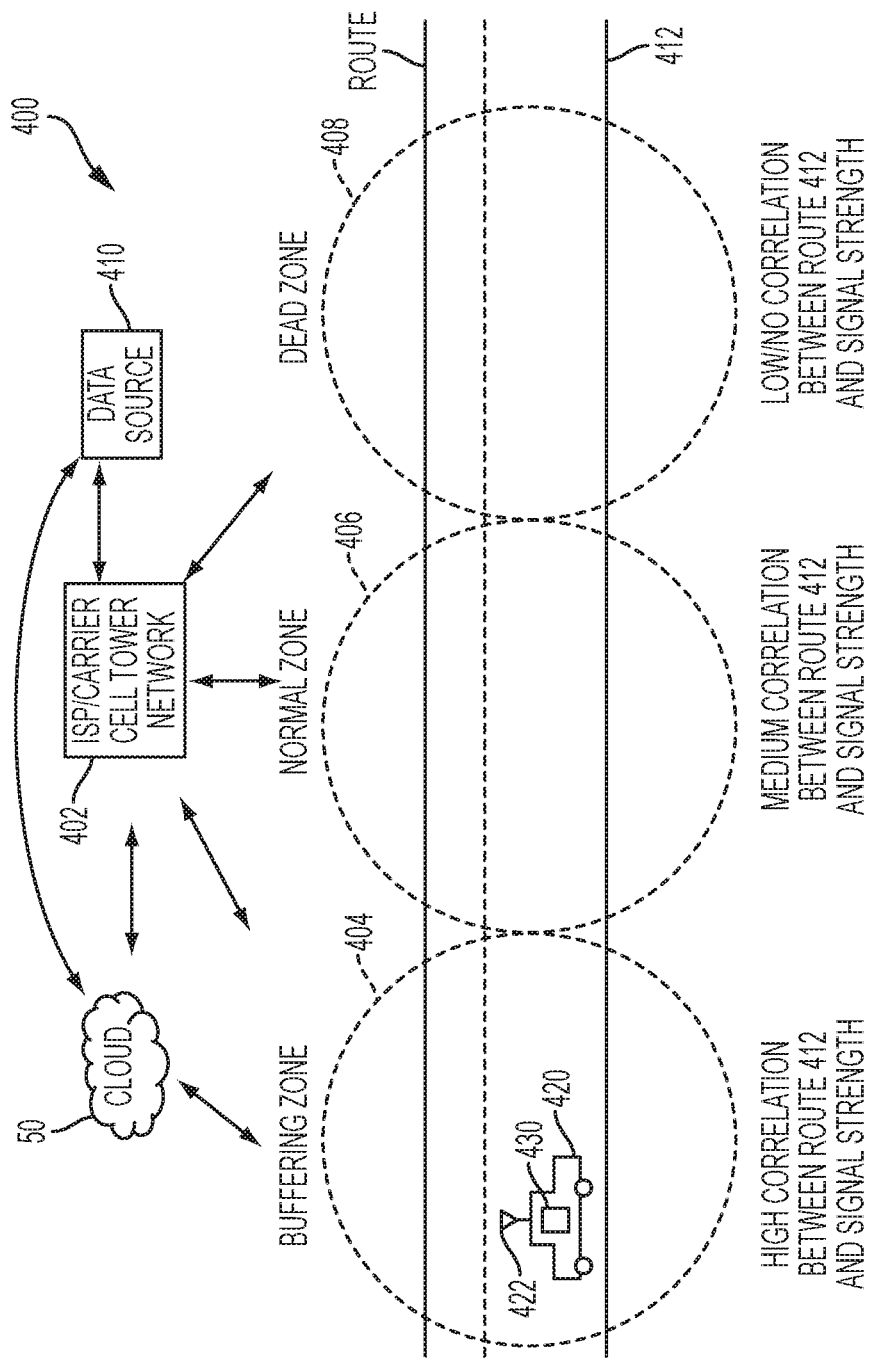
FIG. 4 depicts a block diagram of a system embodying aspects of the present disclosure.
Figure 5:
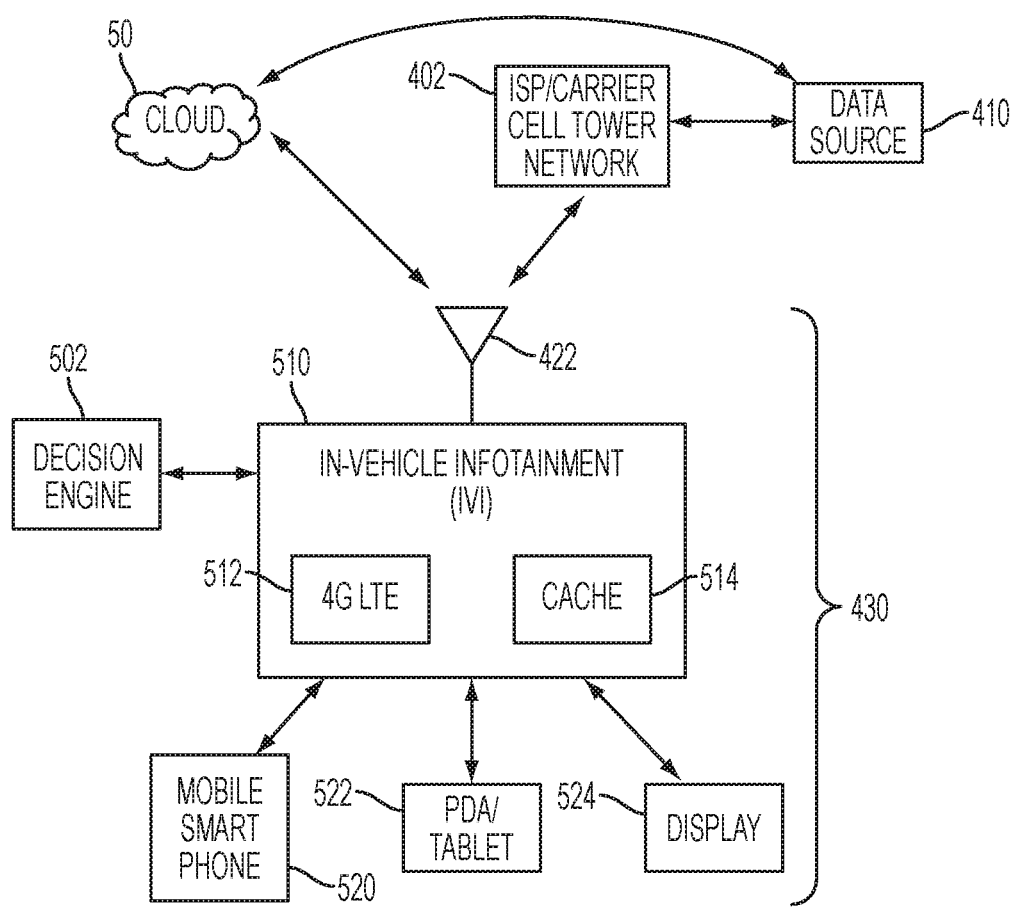
FIG. 5 depicts a block diagram of a connected vehicle embodying aspects of the present disclosure.

Turning now to a more detailed description of the present disclosure, FIG. 4 depicts a diagram illustrating a system 400 embodying aspects of the present disclosure. System 400 includes an ISP/carrier cell tower network 402, a data source 410 for providing data content (e.g., streaming video, music, etc.) to cell tower network 402, a could computing system 50, and a vehicle 420 having an antenna system 422 and a vehicle electronics system 430, configured and arranged as shown. Additional details of vehicle electronics system 430 are shown in FIG. 5 and described in greater detail later in this disclosure. FIG. 4 also depicts a portion of a route 412 on which vehicle 420 is traveling. According to one or more embodiments, route 412 was selected by a driver/passenger (not shown) of vehicle 420, and directions along route 412 are being provided to the driver/passenger of vehicle 420 through a vehicle navigation system of an IVI system 510 (shown in FIG. 5).

Cell tower network 402 defines various coverage areas having various levels of signal strength. Although many coverage areas are provided by cell tower network 402, for ease of illustration, three such coverage areas are shown in FIG. 4, namely buffering zone 404, normal zone 406 and dead zone 408. As will be described in greater detail later in the present disclosure, pre-fetch/store techniques of the present disclosure are utilized to identify buffering zone 404, normal zone 408 and dead zone 408. According to the present disclosure, buffering zone 404 is a portion of the coverage area of cell tower network 402 having a relatively high correlation between selected route 412 and the strength of signals broadcast from cell tower network 402. Also according to the present disclosure, dead zone 408 is a portion of the coverage area of cell tower network 402 having a relatively low correlation between selected route 412 and the strength of signals broadcast from cell tower network 402. Also according to the present disclosure, normal zone 406 is a portion of the coverage area of cell tower network 402 having a relatively medium correlation between selected route 412 and the strength of signals broadcast from cell tower network 402.

Cloud computing system 50 is in wired or wireless electronic communication with one or all of data source 410, cell tower network 402, antenna system 422, and vehicle electronics system 430. Cloud computing system 50 may supplement, support or replace some or all of the functionality of data source 410, cell tower network 402, antenna system 422, and vehicle electronics system 430. Additionally, some or all of the functionality of data source 410, cell tower network 402, antenna system 422, and vehicle electronics system 430 may be implemented as a node 10 (shown in FIG. 1) of cloud computing system 50.

FIG. 5 depicts a block diagram showing portions of system 400, along with additional details of vehicle electronics system 430 of connected vehicle 422. Vehicle electronics system 430 includes antenna system 422, a decision engine 502, an IVI system 510 having a 4G LTE circuit/module 512 and cache memory 514, a mobile smartphone 520, a personal-digital-assistant (PDA)/tablet 522, and a display 524, configured and arranged as shown. IVI system 510 is capable of access the internet through cell tower network 402 to deliver entertainment and information content inside vehicle 420 (shown in FIG. 4). IVI system 510 includes sufficient circuitry (including, e.g., Bluetooth technology) to enable smartphones to help drivers/users control IVI system 510 with voice commands, touch-screen input, or physical controls. IVI system 510 also includes sufficient circuitry (e.g., 4G LTE circuit/module 512) to access, manage and play audio/video content, utilize navigation for driving, deliver rear-seat entertainment such as movies, games, social networking, etc., provide incoming and send outgoing SMS text messages, make phone calls, and access internet-enabled or smartphone-enabled content such as traffic conditions, sports scores, weather forecasts and other streaming content.

Cloud computing system 50 is in wired or wireless electronic communication with one or all of IVI system 510, 4G LTE circuit/module 512, cache memory 514, mobile smartphone 520, PDA/tablet 522 and display 524. Cloud computing system 50 may supplement, support or replace some or all of the functionality of IVI system 510, 4G LTE circuit/module 512, cache memory 514, mobile smartphone 520, PDA/tablet 522 and display 524. Additionally, some or all of the functionality of IVI system 510, 4G LTE circuit/module 512, cache memory 514, mobile smartphone 520, PDA/tablet 522 and display 524 may be implemented as a node 10 (shown in FIG. 1) of cloud computing system 50.

Figure 6:
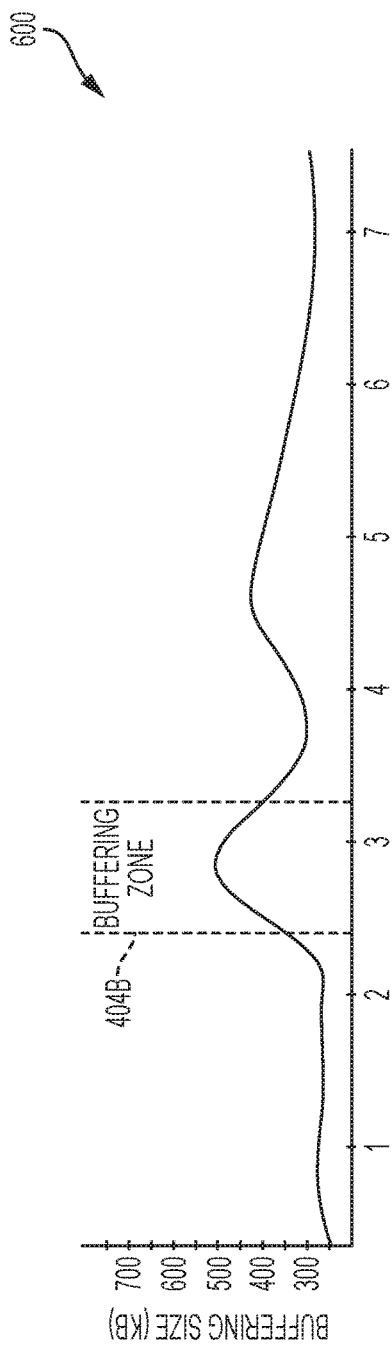
FIG. 6 depicts a graph illustrating an example of bandwidth adjustments made over time according to one or more embodiments of the present disclosure.
Figure 8A:
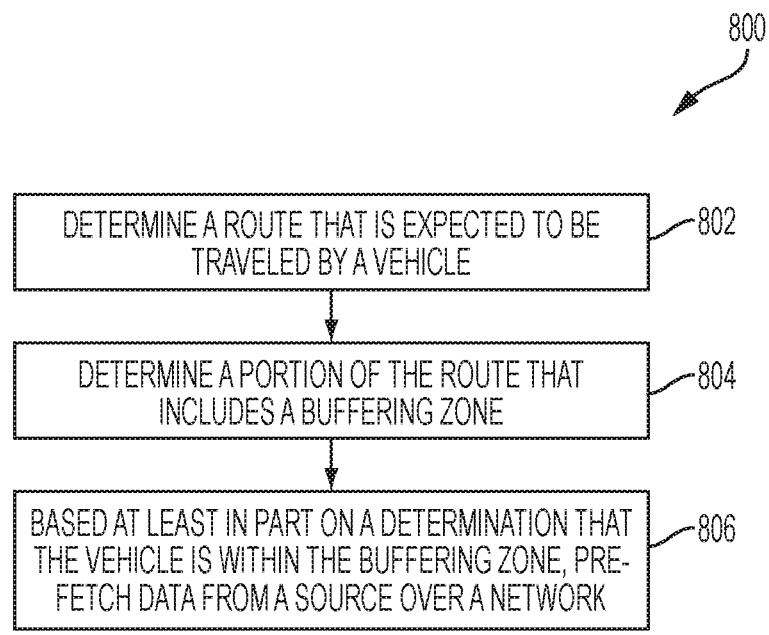
FIG. 8A depicts a flow diagram illustrating a methodology according to one or more embodiments of the present disclosure.
Figure 8B:
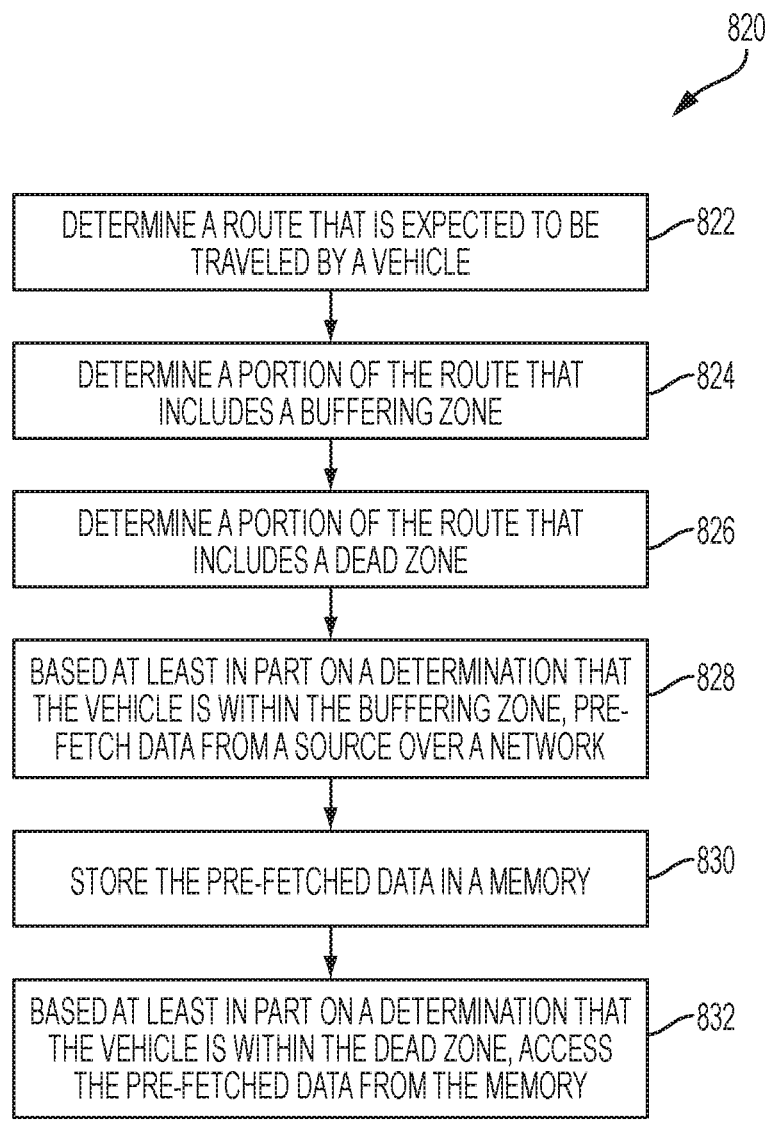
FIG. 8B depicts a flow diagram illustrating a methodology according to one or more embodiments of the present disclosure.
Figure 8C:
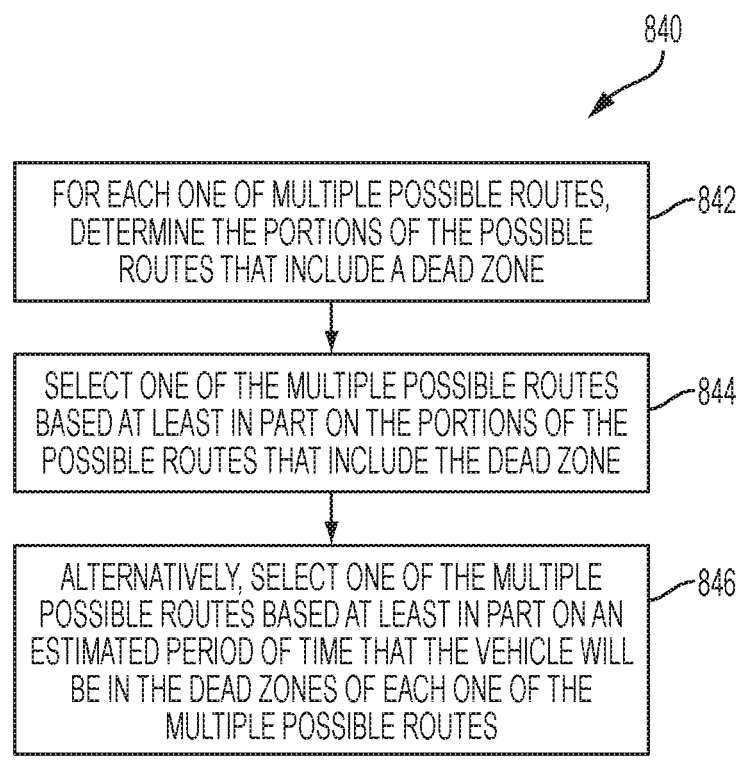
FIG. 8C depicts a flow diagram illustrating a methodology according to one or more embodiments of the present disclosure.

Exemplary operations of vehicle electronics system 430 according to embodiment of the present disclosure will now be described with reference to elements shown in FIGS. 4 and 5, along with methodologies 800, 820, 840 shown in FIGS. 8A, 8B and 8C. Decision engine 502 and IVI system 510 analyze in advance one or more selected factors (block 802 and block 822), including but not limited to travel route 412, the connectivity (i.e., signal strength) of cell tower network 402 along travel route 412, and the active or expected data streams coming into IVI system 510 from data source(s) 410. Based on the analysis performed by decision engine 502 of the one or more selected factors, decision engine 502 identifies buffering zone(s) 404 (block 804 and block 824) along route 412 having high connectivity (e.g., high carrier signal strength). When decision engine 502 and IVS system 510 determine that vehicle 420 is in a buffering zone 404, decision engine 502 controls IVI system 510 to increase the buffer size (i.e., increase the download bandwidth) of IVI system 510, pre-fetch content of the data stream(s) coming into vehicle 420, and store the pre-fetched data in cache memory 514 (block 806, block 828 and block 830). FIG. 6 depicts a graph 600 that plots how buffer size may be adjusted over time according to one or more embodiments. Buffering zone 404B shown in FIG. 6 illustrates one example of the buffer size being increased when decision engine 502 determines that vehicle 420 is in buffering zone 404 shown in FIG. 4.

Based the analysis performed by decision engine 502 of the one or more selected factors, decision engine 502 identifies dead zone(s) 408 (block 826) along route 412 having low or no connectivity (e.g., low or no carrier signal strength). When decision engine 502 and IVS system 510 determine that vehicle 420 is in a dead zone 408, decision engine 502 controls IVI system 510 to switch from accessing the streaming content from the wireless signal path of IVI system 510 (e.g., 4G LTE circuitry/module 512) to accessing the streaming content that was pre-fetched in buffering zone 404 and stored in cache memory 514 (block 832). When vehicle 420 traverses through dead zone 408, content is served from the pre-fetched/stored content data in cache memory 514 without causing any disruption to the user experience.

Based on the analysis performed by decision engine 502 of the one or more selected factors, decision engine 502 determines an estimate of the amount of data to pre-fetch in buffering zone(s) 404 and store in cache memory 514. The amount of pre-fetched data to buffer and store may be selected in order to ensure that enough (or more than enough) data is stored in cache memory 514 to last for the duration of the time period during which vehicle 420 is within dead zone(s) 408.

Figure 7:
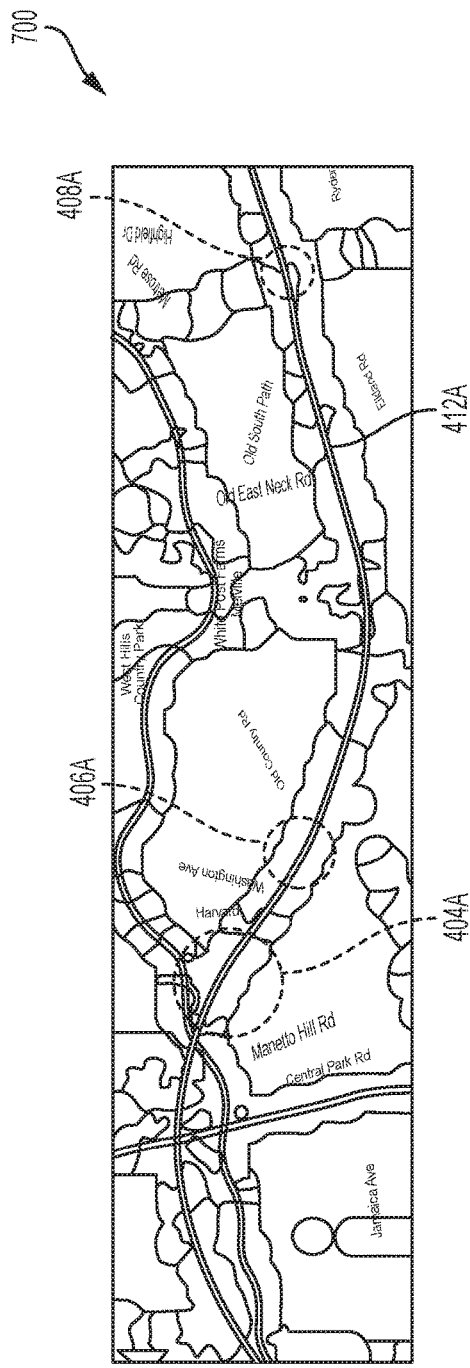
FIG. 7 depicts a graph illustrating an example of a signal coverage map capable of being utilized in connection with one or more embodiments of the present disclosure.

Vehicle electronics system 430 may obtain data about the network connectivity of cell tower network 402 along route 412 by decision engine 502 controlling IVI system 510 to access so-called "signal maps," which provide signal strength data for a wide variety of areas. In one or more embodiments, the signal maps are accessed through cloud computing system 50. Signal maps may be obtained from proprietary sources, such as the various wireless network carriers and/or internet service providers (ISPs). Signal maps may also be obtained from publicly available sources such as www.opensignal.com, www.sensorlv.com, and the like. An example signal map 700 is shown in FIG. 7, wherein buffering zone(s) 404A along the various vehicle routes shown on the map are illustrated by darkly shaded areas, normal zones(s) 406A along the various vehicle routes shown on the map are illustrated by medium shaded areas, and dead zone(s) 408A along the various vehicle routes shown on the map are illustrated by lightly shaded areas. For ease of illustration, only selected buffering zone(s) 404A, normal zones(s) 406A and dead zone(s) 408A along a route 412A shown in FIG. 7 are provided with reference numbers.

Decision engine 502 works in concert with a vehicle navigation system (not shown) of IVI system 510 to analyze in advance the one or more selected factors in order to influence the route planned by the vehicle navigation system. Decision engine 502 influences the planned route by controlling the navigation system to determine the connectivity along the various route options for reaching the selected destination, determine the route option(s) that provide the most network connectivity (e.g., fewest dead zone(s) 408, least estimated time in dead zone(s) 408, etc.) (block 842), and offer to the driver/passenger (not shown) the option of choosing a route having the most network connectivity (i.e., the "most connected" route) (block 844 and block 846). In the event that the most connected route contains dead zone(s) 408 having limited or insufficient wireless connectivity, decision engine 502 adaptively utilizes the disclosed pre-fetch/store techniques to identify buffering zone(s) 404 and pre-fetch/store streaming data (e.g., streaming movie, music, multiple episodes of a TV series, etc.) in cache memory 514 for later use when vehicle 420 is in dead zone(s) 408.

In order to identify buffering zone(s) 404, identify normal zone(s) 406, identify dead zone(s) 408, determine the amount of data to pre-fetch, and identify the "most connected" route(s), decision engine 502 correlates information (i.e., the above-described one or more factors) from multiple sources, including but not limited to the route planned by the vehicle navigation system (e.g., GPS) of IVI system 510, signal coverage maps, an estimate (calculated by decision engine 502) of the time or distance duration of low/no network connectivity in a dead zone, data on environmental factors (e.g., tunnels, mountains, etc.) and the applications that the passengers are accessing or plan to access through vehicle IVS system 510.

One or more of the above-described selected factors may be accessed by decision engine 502 and/or IVI system 510 through cloud computing system 50. The one or more selected factors used by decision engine 502 include but are not limited to an estimate of the duration of low/no network connectivity in dead zone(s) 408, the actual or anticipated/estimated future driving speed of vehicle 420, traffic along route 412, etc. The decision engine 502 makes the above-described determinations (e.g., a 2 mile stretch on Interstate Highway 45 of the planned route is in buffering zone 404, the amount of data to pre-fetch while vehicle 420 is in buffering zone 404, etc.) based on identifying correlations between and among the above-described one or more factors. The correlations can be identified using a correlation coefficient, and the correlation coefficient may be a Pearson product-moment correlation coefficient, which is also known as a Pearson r coefficient.

For example, for a portion of route 412 in which the correlation coefficient (e.g., Pearson r) is near one (1), decision engine 502 determines or concludes that there is a high correlation between the portion of route 412 and signal strength. Accordingly decision engine 502 determines or concludes that the portion of route 412 is a buffering zone 404. For a portion of route 412 in which the correlation coefficient (e.g., Pearson r) is near zero (0), decision engine 502 determines or concludes that there is a low correlation between the portion of route 412 and signal strength. Accordingly decision engine 502 determines or concludes that the portion of route 412 is a dead 408. For a portion of route 412 in which the correlation coefficient (e.g., Pearson r) is near 0.50, decision engine 502 determines or concludes that there is a medium correlation between the portion of route 412 and signal strength. Accordingly decision engine 502 determines or concludes that the portion of route 412 is a normal zone 406.

Decision engine 502 can determine correlations for any combination or number of factors. The specific range of correlation coefficients that define a high correlation, a medium correlation and a low correlation depend on the specific factors being compared, as well as historical and/or empirical analyses of whether how the specific factors correlate. As a non-limiting hypothetical example, historical and/or empirical analyses of the correlation between route location A and signal strength B, may demonstrate that insufficient connectivity for maintaining an uninterrupted streaming of a typical movie is when the correlation coefficient of location A and signal strength B fall below 0.40. As another non-limiting hypothetical example, historical and/or empirical analyses of the correlation between route location A and signal strength B, may demonstrate that a normal level of connectivity for maintaining an uninterrupted streaming of a typical movie is when the correlation coefficient of location A and signal strength B is between about 0.40 and about 0.60. As another non-limiting hypothetical example, historical and/or empirical analyses of the correlation between route location A and signal strength B, may demonstrate that a high level of connectivity for maintaining an uninterrupted streaming of a typical movie and increasing the buffer size and/or bandwidth for the disclosed pre-fetch technique is when the correlation coefficient of location A and signal strength B is between about 0.60 and about one (1).

Decision engine 502 can monitor the active data streams and automatically controls IVI system 510 to apply the disclosed pre-fetch/store techniques to the active streams. Decision engine 502 can also control IVI system 510 to solicit the driver or a passenger to provide IVS system 510 with an identification (or selection) of any other streaming data content to which the driver/passenger would like decision engine 502 and IVI system 510 to apply the disclosed pre-fetch/store technique. The selection of the other streaming data content may be provided to IVS system 510 by a driver/passenger before or during the trip. Decision engine 502 can also monitor the active or planned video streams into vehicle IVS system 510 and proactively pre-fetch portions of the active or planned video streams while vehicle 420 is in buffering zone(s) 404 and before vehicle 420 enters dead zone(s) 408. If multiple display devices (e.g., mobile phone 520, PDA 522, display 524, etc.) in communication with vehicle IVI system 510 are using the same data source (e.g., watching the same drama), decision engine 502 can coordinate the data sharing among the display devices to minimize the data reception. Decision engine 502 can pre-fetch multiple episodes or an entire movie depending on the length of the travel or the user's patterns. Decision engine 502 can also recommend a number of episodes in a TV series to pre-fetch based on a predicted period of travel through dead zone(s) 408.

Thus it can be seen from the foregoing detailed description that the present disclosure provides a number of technical benefits. According to the present disclosure, one or more embodiments provide methods, systems and computer program products for incorporating in a vehicle's electronic circuitry a decision engine that, working in concert with the vehicle's IVI system, improves the quality of a passenger's in-vehicle online experience during a journey. The decision engine and IVI system are described separately herein as a matter of convenience. However, in practice, the decision engine and IVI system may be an integrated component. By analyzing in advance one or more selected factors, including but not limited to the travel route a vehicle is going to take (or is taking), the availability of network connectivity along a selected vehicle travel route, and the active or expected data streams coming into the IVI system, the decision engine in the vehicle can improve the user experience of certain applications such as video streaming, smartphone based GPS applications, etc., even if the vehicle is completely cut off from carrier networks (such as traveling through a tunnel) during the journey.

Figure 9:
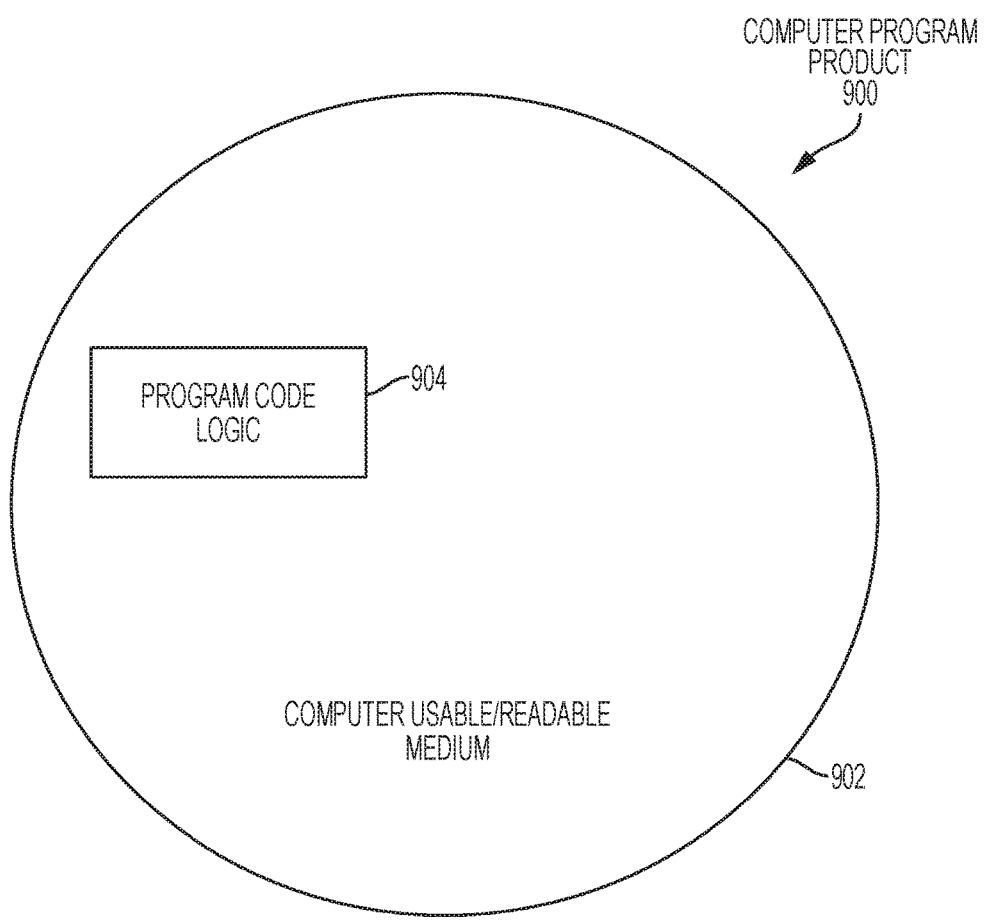
FIG. 9 depicts a computer program product in accordance with one or more embodiments of the present disclosure.

Referring now to FIG. 9, a computer program product 900 in accordance with an embodiment that includes a computer readable storage medium 902 and program instructions 904 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. A computer implemented method of receiving data at a vehicle having control circuitry configured to wirelessly couple a processor system in the vehicle to a network, the method comprising:
   determining, using the processor system, a route that is expected to be traveled by the vehicle;
   segmenting, using the processor, the route to identify a first zone, a second zone, and a third zone of the route;
   wherein the first zone is identified based at least in part on a presence in the first zone of a first strength of signals transmitted over the network;
   wherein the second zone is identified based at least in part on a presence in the second zone of a second strength of signals transmitted over the network;
   wherein the third zone is identified based at least in part on a presence of a third strength of signals transmitted over the network;
   wherein the first strength of signals is greater than the third strength of signals;
   wherein the second strength of signals is between the first strength of signals and the third strength of signals;
   determining, using the processor system, a start and an end of the first zone of the route, wherein the first zone comprises a buffering zone, wherein the start and the end of the buffering zone defines an area of the route in which the first strength of signals transmitted over the network meets a predetermined criterion; and
   based at least in part on a determination that the vehicle is within the buffering zone, pre-fetching data from a source over the network.

2. The computer implemented method of claim 1 further comprising, based at least in part on the determination that the vehicle is within the buffering zone, increasing a size of a buffer for prefetching the data.

3. The computer implemented method of claim 1 further comprising:
   storing the pre-fetched data in a memory;
   wherein the third zone comprises a dead zone;
   determining, using the processor system, a portion of the route that includes the dead zone, wherein the dead zone comprises an area in which the third strength of signals transmitted over the network meets another predetermined criterion; and
   based at least in part on a determination that the vehicle is within the dead zone, accessing the pre-fetched data from the memory.

4. The computer implemented method of claim 3, wherein determining the portion of the route that includes the dead zone is based at least in part on a factor selected from the group consisting of:
   the route;
   a signal coverage map; and
   environmental conditions.

5. The computer implemented method of claim 3, wherein the portion of the route that includes the dead zone is further along the route than the portion of the route that includes the buffering zone.

6. The computer implemented method of claim 3 further comprising:
   determining, using the processor system, an amount of data to pre-fetch based at least in part on a factor selected from the group consisting of:
      an estimated period of time that the vehicle will be in the dead zone;
      an estimate period of time that the vehicle will be in the buffering zone;
      an estimated period of time that it will take the vehicle to travel from the buffering zone to the dead zone;
      an estimated distance on the route from the buffering zone to the dead zone;
      an estimated distance on the route from a beginning of the buffering zone to an end of the buffering zone; and
      an estimated distance on the route from a beginning of the dead zone to an end of the dead zone.

7. The computer implemented method of claim 1, wherein the predetermined criterion comprises meeting or exceeding a level of correlation between a location of the vehicle on the route and the strength of signals transmitted over the network.

8. The computer implemented method of claim 7, wherein the level of correlation comprises a correlation coefficient.

9. The computer implemented method of claim 8, wherein the correlation coefficient comprises a Pearson product-moment correlation coefficient.

10. The computer implemented method of claim 3, wherein the another predetermined criterion comprises meeting or falling below a level of correlation between a location of the vehicle on the route and the strength of signals transmitted over the network.

11. The computer implemented method of claim 10, wherein the level of correlation comprises a correlation coefficient.

12. The computer implemented method of claim 11, wherein the correlation coefficient comprises a Pearson product-moment correlation coefficient.

13. The computer implemented method of claim 3 further comprising selecting, using the processor system, the route from multiple possible routes based at least in part on the dead zone.

14. A computer program product for receiving data at a vehicle having control circuitry configured to wirelessly couple a processor system of the vehicle to a network, the computer program product comprising:
   a computer readable storage medium having program instructions embodied therewith, wherein the computer readable storage medium is not a transitory signal per se, the program instructions readable by the processor system to cause the processor system to perform a method comprising:
      determining a route that is expected to be traveled by the vehicle;
      segmenting the route to identify a first zone, a second zone, and a third zone of the route;
      wherein the first zone is identified based at least in part on a presence in the first zone of a first strength of signals transmitted over the network;
      wherein the second zone is identified based at least in part on a presence in the second zone of a second strength of signals transmitted over the network;
      wherein the third zone is identified based at least in part on a presence of a third strength of signals transmitted over the network;
      wherein the first strength of signals is greater than the third strength of signals;
      wherein the second strength of signals is between the first strength of signals and the third strength of signals;
      determining a start and an end of the first zone of the route, wherein the first zone comprises a buffering zone, wherein the start and the end of the buffering zone defines an area of the route in which the first strength of signals transmitted over the network meets a predetermined criterion; and based at least in part on a determination that the vehicle is within the buffering zone, pre-fetching data from a source over the network.

15. The computer program product of claim 14, wherein the method performed by the processor system further comprises, based at least in part on the determination that the vehicle is within the buffering zone, increasing a size of a buffer for prefetching the data.

16. The computer program product of claim 14, wherein the method performed by the processor system further comprises:
   storing the pre-fetched data in a memory;
   wherein the third zone comprises a dead zone;
   determining, using the processor system, a portion of the route that includes the dead zone, wherein the dead zone comprises an area in which the third strength of signals transmitted over the network meets another predetermined criterion; and
   based at least in part on a determination that the vehicle is within the dead zone, accessing the pre-fetched data from the memory.

17. The computer program product of claim 16, wherein determining the portion of the route that includes the dead zone is based at least in part on a factor selected from the group consisting of:
   the route;
   a signal coverage map; and
   environmental conditions.

18. The computer program product of claim 16, wherein the portion of the route that includes the dead zone is further along the route than the portion of the route that includes the buffering zone.

19. The computer program product of claim 16, wherein the method performed by the processor system further comprises:
   determining an amount of data to pre-fetch based at least in part on a factor selected from the group consisting of:
      an estimated period of time that the vehicle will be in the dead zone;
      an estimate period of time that the vehicle will be in the buffering zone;
      an estimated period of time that it will take the vehicle to travel from the buffering zone to the dead zone;
      an estimated distance on the route from the buffering zone to the dead zone;
      an estimated distance on the route from a beginning of the buffering zone to an end of the buffering zone; and
      an estimated distance on the route from a beginning of the dead zone to an end of the dead zone.

* * * * *